July 25, 1967  J. WISLOCKY  3,333,163
RECTIFIER ASSEMBLY WITH INTERCONNECTING BUS-BAR SUPPORTS
Filed Feb. 15, 1965

INVENTOR.
JOSEPH WISLOCKY
BY
OSTROLENK, FABER, GERB & SOFFEN
ATTORNEYS

United States Patent Office 3,333,163
Patented July 25, 1967

3,333,163
RECTIFIER ASSEMBLY WITH INTERCONNECTING BUS-BAR SUPPORTS
Joseph Wislocky, El Segundo, Calif., assignor to International Rectifier Corporation, El Segundo, Calif., a corporation of California
Filed Feb. 15, 1965, Ser. No. 432,541
2 Claims. (Cl. 317—234)

This invention relates to a novel rectifier assembly, and more specifically relates to a novel construction particularly adapted for ignitron tube replacement systems using compression bonded diodes.

Compression bonded diodes are known to the art, and are shown, for example, in copending application Ser. No. 361,827, filed Apr. 22, 1964 in the name of Boyer, entitled "Compression Bonded Semiconductor Device," and assigned to the assignee of the present invention.

The principle of the present invention is to provide a novel bus bar assembly and mechanical support system for connecting this type of diode in a novel arrangement particularly suitable for ignitron tube replacement assemblies.

Accordingly, a primary object of this invention is to provide a novel rectifier assembly which is extremely simple to manufacture.

Yet another object of this invention is to provide a novel rectifier assembly for ignitron tube replacement which is adapted for use with compression bonded diodes.

A further object of this invention is to provide a novel rectifier assembly which has therein at least two series connected diodes and forms a unitary building block for building a rectifier system which includes as many series connected rectifiers as desired.

These and other objects of this invention will become apparent from the following description when taken in connection with the drawings, in which.

Figure 1:
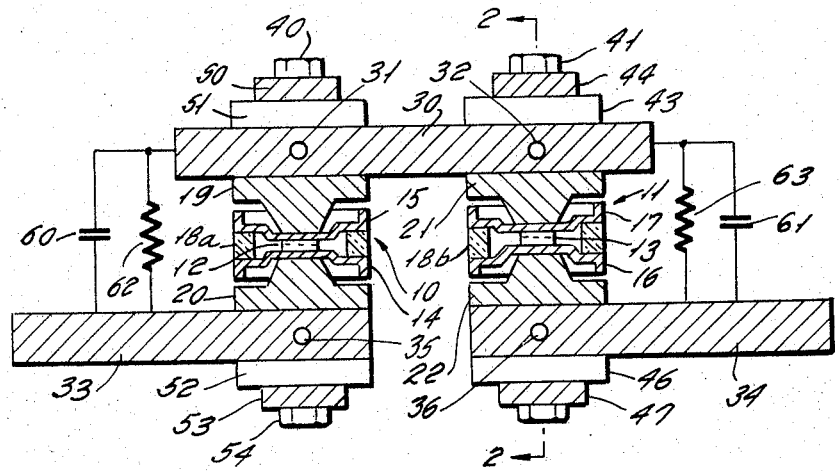
FIGURE 1 is a cross-sectional view of the novel rectifier assembly in the invention.
Figure 2:
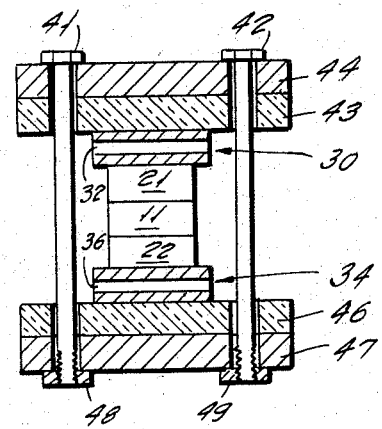
FIGURE 2 is a cross-sectional view of FIGURE 1 taken across the lines 2—2 in FIGURE 1.
Figure 3:
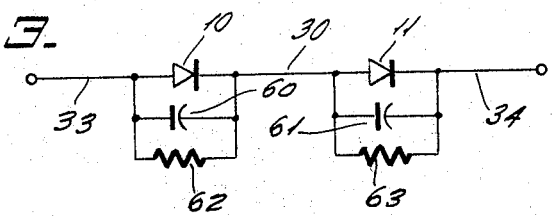

FIGURE 3 schematically illustrates the series connection of the diodes of FIGURES 1 and 2.

Referring now to the figures, I have illustrated the novel rectifier assembly for the case of two series connected diodes 10 and 11. Each of these diodes are of the type adapted for use in compression bonded mounting assemblies, and may be identical to the devices shown in the above noted copending application Ser. No. 361,827.

In general, diodes 10 and 11 are comprised of silicon wafers 12 and 13, respectively, which are mounted between flexible conductive caps 14-15 and 16-17, respectively, which are secured to one another by the insulation rings 18a and 18b, respectively. These assemblies are then mounted between the extending conductive studs 19-20 and 21-22, as shown, wherein the studs have extending sections engaging the central portions of the metal caps 14 through 17.

The studs 19 and 21 then extend from a common bus bar 30 which could, for example, have water-cooling channels 31 and 32 therethrough. Studs 19 and 21 could, for example, be brazed to the bus 30. The studs 20 and 22 are then similarly brazed to respective bus bars 33 and 34, respectively, which could also have water-cooling channels 35 and 36.

In order to secure the assemblage together, four bolt arrangements are provided which include the bolts 40, 41 and 42, and a fourth bolt, not shown, which would be immediately behind bolt 40 in FIGURE 1. These bolts preferably have an insulation coating thereon, or carry insulation tubes therearound.

The bolts 41 and 42 shown in FIG. 2 pass through openings in an insulation block 43, and the heads of bolts 41 and 42 seat upon a steel pad 44. They then extend downwardly into insulation pad 46 and a steel pad 47, and are then secured by nuts 48 and 49, respectively. Suitable pressure limiting washers can be interposed between nuts 48 and 49 and the steel pad 47. The bolt 40 and the bolt behind bolt 40 in FIG. 1 are similarly secured where, for example, the bolt 40 extends through the steel pad 50, the insulation pad 51, insulation pad 52 and steel pad 53, where the bottoms of these bolts are then secured identical to nuts 48 and 49 with pressure limiting washers as required.

The diodes 10 and 11 are then so arranged that they are connected in series between the bus bars 33 and 34, as schematically illustrated in FIGURE 3. In order to insure predetermined voltage distribution across the diodes 10 and 11, parallel connected resistors and capacitors such as capacitors 60 and 61, respectively, and resistors 62 and 63, respectively, are connected across diodes 10 and 11 as shown.

It will be noted that the novel arrangement provided by the invention lends itself to extremely simplified manufacturing techniques and can be easily installed in the field. Moreover, while the figures illustrate the invention for the use of only two diodes, it will be apparent that the structure can be repeated as many times as desired in order to make a string of as many series connected diodes as desired.

Moreover, the arrangement of FIGURES 1 and 2 can serve as the first element of a building block of elements wherein, when more than two diodes are desired in series, a second unit identical to the device of FIGURE 1 can be connected directly in series therewith.

Although this invention has been described with respect to its preferred embodiments, it should be understood that many variations and modifications will now be obvious to those skilled in the art, and it is preferred, therefore, that the scope of the invention be limited not by the specvific disclosure herein, but only by the appended claims.

The embodiments of the invention in which an exclusive privilege or property is claimed are defined as follows:

1. A rectifier assembly comprising a first and second rectifier diode, a first, second and third bus bar, and first and second clamping means; said first and second rectifier diodes each comprising a semiconductor wafer having a rectifying junction therein, and upper and lower conductive housing portions adjacent the upper and lower surfaces of their said wafers; said upper and lower conductive housing portions being flexible into high pressure engagement with said upper and lower surfaces of their said wafers; said upper housing portions of said first and second rectifier diode positioned adjacent a first surface of said first bus bar and being spaced from one another along said first surface of said first bus bar; said lower housing portion of said first rectifier diode being positioned adjacent a first surface of said second bus bar; said lower housing portion of said second rectifier diode being positioned adjacent a first surface portion of said third bus bar; said first surfaces of said second and third bus bars being coplanar with one another and being in spaced parallel relation with said first surface of said first bus bar; said second and third bus bars having first ends adjacent one another in spaced relation to one another and second ends defining terminals for said rectifier assembly; said first clamping means connected from said first bus bar to said second bus bar and clamping said first and second bus bars toward one another; said second clamping means connected from said first bus bar to said third bus bar and clamping said first and third bus bars toward one another;

said rectifying junctions of said semiconductor wafers each passing forward current in the same direction between said terminals.

2. The device substantially as set forth in claim 1 which further includes extending conductive studs extending from said first, second and third bus bars and into engagement with said upper conductive housing portions and said first and second lower conductive housing portions, respectively.

References Cited

UNITED STATES PATENTS

| 1,715,691 | 6/1929 | Ackerly | 317—234 |
| 2,189,887 | 2/1940 | Elsome-Jones et al. | 317—234 |
| 2,740,075 | 3/1956 | Walker et al. | 317—234 |
| 2,847,623 | 8/1958 | Thornhill | 317—234 |
| 2,907,935 | 10/1959 | Nagonsen | 317—234 |

JAMES D. KALLAM, *Primary Examiner.*